Patented Jan. 16, 1951

2,537,956

UNITED STATES PATENT OFFICE 2,537,956

ENAMEL OPACIFIER AND METHOD OF USING

William J. Baldwin, Snyder, N. Y., assignor, by mesne assignments, to National Lead Company, New York, N. Y., a corporation of New Jersey No Drawing. Application December 31, 1946, Serial No. 719,617

4 Claims. (Cl. 106—48)

The present invention relates to a mill addition opacifier for use in vitreous enamels and particularly to an opacifier for use with zirconium-opacified frits of the type which develop opacity on heating in the enameling cycle.

In the enameling of metal and particularly sheet iron and steel, the ultimate object is to obtain a vitreous coating upon the metal base which presents a high degree of opacity as this is an esthetic requirement in enameling, as great a coverage as possible and a finished vitreous coating which is resistant to strains and impact incident to assembly, storage, transportation or use.

A very important feature of a finished enamel article and, therefore, of the enamel to be applied to the article, is the diffuse reflectance or opacity of the enamel coating. In general, the opacity may be obtained by adding materials to the glass composing the frit as, for instance, certain compounds of fluorine or antimony, to mention but two of the more popular older types, or zircon as a more recent opacifier. Or, opacifiers may be added to the frit subsequent to its manufacture and milled therewith as a separate individual ingredient, so-called mill addition opacifiers.

Vitreous enamel coatings of exceptional properties have been produced in recent years which depend for their opacity upon the presence of compounds of zirconium in the frit. Patents Nos. 1,944,938 of January 30, 1934, to C. J. Kinzie and 2,326,348 of August 10, 1943, to Frost and Commons relate to enameling or glazing frit compositions depending upon zircon type opacifiers to obtain relatively high reflectance values; additional phases of this important field are described in patents to Bahnsen et al. Nos. 2,250,456 and 2,250,457 of July 29, 1941, and 2,324,812 of July 20, 1943. Frits of this type develop opacity in the enameling cycle, in contrast with frits of other types wherein the opacity is already developed in the manufacture of the frit.

In general, the greater the amount of an opacifier in a frit, the higher the opacity of the finished enamel; however, it is known that, at times, surface difficulties in the enamel may be caused by attempts to include too great an amount of an opacifier in the frit glass. These surface difficulties decrease the esthetic value of the enamel coating and, therefore, in effect, defeat one of the purposes of the addition of the opacifier.

In accordance with the present invention the opacity of zirconium-opacified enamels of the type which develop opacity on heating the frit during the enameling cycle may have their opacity increased by the employment of specially prepared opacifiers containing aluminum oxide, antimony oxide and phosphorus pentoxide. These special opacifiers are synthetically prepared from materials providing aluminum oxide, antimony oxide and phosphorus pentoxide by calcining such materials with the production of an end product which when finely ground and used as a mill addition increases the reflectance value of the finished enamel. In Serial No. 629,912, filed November 20, 1945, by William J. Baldwin, now Patent No. 2,500,231, there is discussed an enamel opacifier containing zirconium oxide, phosphorus pentoxide and aluminum and, in an application, Serial No. 716,429, filed December 14, 1946, there is discussed a mill addition opacifier of aluminum oxide and phosphorus pentoxide.

In accordance with the present invention the special mill addition opacifier consisting substantially entirely of phosphorus pentoxide, antimony oxide and aluminum oxide may be prepared by suitably combining materials containing these ingredients or by combining the oxides themselves under suitable calcining conditions. Thus, the opacifier may be prepared from a mixture of suitable raw material containing the oxides mentioned, or of the oxides themselves, by calcining such mixture at temperatures above about 1600° F. and generally in the neighborhood of 2000° F., or at such other temperature at which ceramic combination of the compounds occurs to produce a relatively homogeneous sinter. The time required will be from about ½ hour to about 2 hours. After calcining the batch, the resultant product is thoroughly pulverized to an appropriate fineness, that is, on the order of ½ to 1 micron, and preferably as near the lower limit as possible. The product so prepared, when used to the extent of about 2 to 4% as a mill addition to a commercial zirconium opacified frit of the type developing opacity during the enameling cycle, increased the reflectance value of the final enamel as compared to the reflectance value of an enamel obtained without the presence of such mill addition material. In general, the composition of the mill addition opacifier of the present invention comprises the tertiary system aluminum oxide, antimony oxide and phosphorus pentoxide within the ranges 40% to 60% $Al_2O_3$, 40% to 20% $Sb_2O_3$ and 40% to 20% $P_2O_5$. One of the molecular formula in this range corresponds generally to an empirical oxide formula of $3Al_2O_3.P_2O_5.Sb_2O_3$.

Where the pure oxides are not employed as raw materials from which the mill addition of the present invention is manufactured, accepted raw material used in the manufacture of enamel frits will be found suitable, that is to say, amblygonite, aluminum oxide, aluminum metaphosphate or other accepted sources of raw material.

As specific examples merely illustrative of the invention but not limitative thereof, raw batches were made as shown in the following examples by grinding the materials of the raw batch together and heating the batch to about 1800° F. for two hours. The product of the calcination was then ground by wet milling the same until a particle size of about 5 microns or less was obtained. Two parts of the resulting ground opacifier was added for each 100 parts of frit and milled therewith, the composition in the mill being as follows:

100 parts frit
6 parts micronized clay
2 parts special opacifier
0.1 part sodium nitrite
42 parts water The mixture in the mill was wet ground to a fineness of 3 to 4% residue on a 200 mesh screen. The resulting slurry was applied to 4″ x 6″ standard test plates at rates of 30, 40, 50 and 60 grams per square foot application and then fired at 1520° F. for three minutes. The reflectance values of the resulting enameling plates were determined in the usual way by means of a Hunter Reflectometer. The composition of the samples is given in Table I and the reflectance values are given in Table II.

TABLE I

Batch weight and percentage composition of opacifiers tested

|  | A | B | C | D | E |
|---|---|---|---|---|---|
| Amblygonite | 430 | 450 | 560 | 900 | 900 |
| Alumina Hydrate | 430 | 695 | 90 | 153 |  |
| Antimony Oxide | 393 | 200 | 500 | 200 | 350 |
| $Al_2O_3$ | 41.5 | 60.0 | 25.0 | 40.0 | 30.0 |
| $P_2O_5$ | 19.2 | 20.0 | 25.0 | 40.0 | 40.0 |
| $Sb_2O_3$ | 39.3 | 20.0 | 50.0 | 20.0 | 30.0 |

TABLE II

| No. | Per cent Composition of Oxide | | | Reflectance Value at Application Weight | | | |
|---|---|---|---|---|---|---|---|
|  | $Al_2O_3$ | $P_2O_5$ | $Sb_2O_3$ | 30 gr./sq. ft. | 40 gr./sq. ft. | 50 gr./sq. ft. | 60 gr./sq. ft. |
| A | 41.5 | 19.2 | 39.3 | 67.0 | 72.7 | 76.5 | 78.8 |
| B | 60.0 | 20.0 | 20.0 | 68.0 | 73.3 | 77.2 | 79.6 |
| C | 25.0 | 25.0 | 50.0 | 65.0 | 69.7 | 73.2 | 75.3 |
| D | 40.0 | 40.0 | 20.0 | 67.0 | 72.4 | 76.1 | 78.4 |
| E | 30.0 | 40.0 | 30.0 | 67.0 | 71.1 | 74.9 | 77.4 |
| No opacifier |  |  |  | 67.0 | 71.8 | 75.4 | 77.6 |

The milled zirconium-opacified frit having the special mill addition opacifier of the present invention added to it produced an enameled surface having a considerably greater reflectance at the same rate of application than the frit itself as set forth above in Table II. The commercial zirconium-opacified frits of the type which develop opacity during the enameling cycle and to which the mill addition opacifiers of the present invention may be added with advantage may possess the following approximate composition:

| | Per cent |
|---|---|
| $SiO_2$ | 25–40 |
| $Al_2O_3$ | 7–16 |
| $B_2O_3$ | 10–20 |
| $KNaO$ | 10–16 |
| $CaO$ | 3–7 |
| $F_2$ | 5–10 |
| $ZrO_2$ | 10–15 |
| $ZnO$ | 2–14 |
| $P_2O_5$ | 0.5–3 |
| $TiO_2$ | 0–2 |

The preferred composition of the special mill addition opacifier of the present invention is within the range 40% to 60% $Al_2O_3$, 40% to 20% $Sb_2O_3$ and 40% to 20% $P_2O_5$, and one of the compositions corresponds generally and preferably to an empirical oxide formula $$3Al_2O_3 \cdot P_2O_5 \cdot Sb_2O_3$$

(disregarding non-significant ingredients). Calcined compositions of these ingredients without this range do not produce acceptable reflectance values when employed as mill addition opacifiers for zirconium opacified frits of the type that develop opacity in heating, probably by reason of the fact that they become soluble in the frit when heated therewith during the enameling cycle.

It will be understood that the usual amounts of clay, electrolyte and the like are added in the mill in the usual way when milling the frit to prepare the enamel slurry.

What is claimed is:

1. The method of increasing the opacity of an enamel composition containing combined zirconium wherein the opacity is developed on heating in the enameling cycle, which comprises adding 2 to 4% of a calcined product containing $Al_2O_3$, $P_2O_5$ and $Sb_2O_3$ as the essential ingredients and in amounts corresponding essentially to the empirical formula $3Al_2O_3 \cdot P_2O_5 \cdot Sb_2O_3$, to the enamel composition as a mill addition opacifier and heating to an enamel-forming temperature of 1520° C.

2. The method of increasing the opacity of an enamel composition containing combined zirconium wherein the opacity is developed on heating in the enameling cycle, which comprises adding 2 to 4% of a calcined product containing $Al_2O_3$, $P_2O_5$, and $Sb_2O_3$ as the essential ingredients in amounts within the range 40% to 60% $Al_2O_3$, 40% to 20% $P_2O_5$ and 40% to 20% $Sb_2O_3$, to the enamel composition as a mill addition opacifier and heating to an enamel-forming temperature of 1520° C.

3. A mill addition opacifier for enamel compositions of the type containing combined zirconium wherein the opacity is developed on heating in the enameling cycle which consists of a calcined product containing $Al_2O_3$, $P_2O_5$ and $Sb_2O_3$ as the essential ingredients in amounts corresponding essentially to the empirical molecular formula $3Al_2O_3 \cdot P_2O_5 \cdot Sb_2O_3$.

4. A mill addition opacifier for enamel compositions of the type containing combined zirconium wherein the opacity is developed on heating in the enameling cycle which consists of a calcined product containing $Al_2O_3$, $P_2O_5$ and $Sb_2O_3$ as the essential ingredients in amounts in the range 40% to 60% $Al_2O_3$, 40% to 20% $P_2O_5$ and 40% to 20% $Sb_2O_3$.

WILLIAM J. BALDWIN.

REFERENCES CITED

The following references are of record in the file of this patent:

UNITED STATES PATENTS

| Number | Name | Date |
|---|---|---|
| 2,199,794 | Harshaw | May 7, 1940 |
| 2,252,588 | Whitesell | Aug. 12, 1941 |
| 2,347,187 | Frost | Apr. 25, 1944 |